(12) United States Patent
Chen et al.

(10) Patent No.: US 12,619,135 B2
(45) Date of Patent: May 5, 2026

(54) PHOTOGRAPH DEVICE HOLDER

(71) Applicant: LIANHONG ART CO., LTD.,
Taoyuan City (TW)

(72) Inventors: Chia-Hui Chen, Taoyuan City (TW);
Tzu-Yu Lin, Taoyuan City (TW);
Ching-Jung Lai, Taoyuan City (TW);
Yen-Ting Lai, Taoyuan City (TW)

(73) Assignee: LIANHONG ART CO., LTD.,
Taoyuan City (TW)

( * ) Notice: Subject to any disclaimer, the term of this
patent is extended or adjusted under 35
U.S.C. 154(b) by 176 days.

(21) Appl. No.: 18/791,361

(22) Filed: Jul. 31, 2024

(65) Prior Publication Data

US 2026/0036887 A1      Feb. 5, 2026

(51) Int. Cl.
G03B 17/56          (2021.01)

(52) U.S. Cl.
CPC .................................. G03B 17/561 (2013.01)

(58) Field of Classification Search
CPC ...... G03B 17/56; G03B 17/561; F16M 13/00;
F16M 13/02; F16M 13/022; F16M
2200/027
See application file for complete search history.

(56) References Cited

U.S. PATENT DOCUMENTS 6,705,578 B2 * 3/2004 Mulford ................ A01M 31/02
248/187.1
10,557,590 B1 * 2/2020 Brassard .................. B62J 11/00

2009/0026330 A1 * 1/2009 Law ..................... F16M 11/242
248/163.1
2013/0193288 A1 * 8/2013 Congdon .............. F16M 11/14
248/231.41

(Continued)

FOREIGN PATENT DOCUMENTS

CN      201723942 U      1/2011
CN      208401930 U      1/2019

(Continued)

OTHER PUBLICATIONS

PCT search report dated Feb. 18, 2025 of the corresponding PCT
patent application No. PCT/CN2024/100266.

(Continued)

*Primary Examiner* — Daniel M Pasiewicz
(74) *Attorney, Agent, or Firm* — HDLS IPR SERVICES;
Chun-Ming Shih

(57)          ABSTRACT

A photograph device holder having a base, a main bracket,
a fixed clamp arm, a movable clamp arm, and an adjusting
mechanism is provided. The photograph device holder is for
fixing a photograph device and used to clamp on a work-
piece. The photograph device is arranged on the base. The
main bracket connects to the base and extends along a
longitudinal direction. The fixed clamp arm is arranged on
the base or the main bracket. The movable clamp arm moves
along the longitudinal direction. The adjusting mechanism is
arranged on the main bracket and drives the movable clamp
arm closer to or away from the fixed clamp arm along the
longitudinal direction such that the fixed and the movable
clamp arm may clamp or release the workpiece. The pho-
tograph device holder is therefore clamping on the work-
piece of different sizes or shapes to make the photograph
device to shoot stably.

10 Claims, 14 Drawing Sheets

(56)         References Cited

U.S. PATENT DOCUMENTS

| 2015/0108306 A1* | 4/2015 | Chuang .................. F16M 11/14 |
| | | 248/231.51 |
| 2021/0123561 A1 | 4/2021 | Smith |

FOREIGN PATENT DOCUMENTS

| CN | 216184861 U | 4/2022 |
| TW | M660175 U | 9/2024 |

OTHER PUBLICATIONS

Office Action dated Feb. 20, 2025 of the corresponding Taiwan patent application No. 113121927.

* cited by examiner

PHOTOGRAPH DEVICE HOLDER

BACKGROUND

Technical Field

The present disclosure relates to a holder, particularly to a photograph device holder for a photograph device to be fixed and used to clamp on a workpiece.

Description of Related Art

Both professionals and ordinary people widely use photograph devices such as cameras or mobile phones to capture beautiful views in modern life. With the popularity and diversification of photograph devices, many kinds of photograph device holders have been derived to allow users to shoot photo with ease. Common photograph device holders are divided into handheld type and fixed type. The handheld type fixes the photograph device on the photograph device holder so that the user can hold the photograph device for shooting. The fixed type fixes the photograph device on the photograph device holder so that the user may place it on the ground or table to use.

However, neither the handheld nor the fixed type of the photograph device holder may be fixed on articles of different shapes or sizes, but only for holding or placing by the user. Thus, when the user has difficulty to hold the photograph device holder for shooting and is in an environment inconvenient for user to place the photograph device holder on the ground or a flat surface for shooting, the user may not shoot stably and miss beautiful views. How to design a photograph device holder that can be placed, fixed on an article, or held by the user depending on different environments is an urgently desired improvement.

In view of the above, the inventor seeks to overcome the aforementioned drawbacks associated with the current technology and aims to provide an effective solution through extensive researches along with utilization of academic principles and knowledge.

SUMMARY

The primary objective of the present disclosure is to clamp and fix the photograph device holder on articles of different shapes or sizes such that the photograph device may shoot stably.

To accomplish the aforementioned objective, the present disclosure provides a photograph device holder for a photograph device to be fixed and is used to clamp on a workpiece, the photograph device holder includes a base, a main bracket, a fixed clamp arm, a movable clamp arm, and an adjusting mechanism. The photograph device is arranged on the base. The main bracket is connected to the base and extends along a longitudinal direction. The fixed clamp arm is arranged on the base or the main bracket. The movable clamp arm is movable along the longitudinal direction. The adjusting mechanism is arranged on the main bracket. The adjusting mechanism is configured to drive the movable clamp arm to move close to or away from the fixed clamp arm along the longitudinal direction such that the movable clamp arm and the fixed clamp arm may clamp the workpiece together or release the workpiece.

Another aspect of the present disclosure provides that the main bracket defines a limit groove, the limit groove is configured to extend along the longitudinal direction, the adjusting mechanism includes a sliding seat, the sliding seat is accommodated in the limit groove and restricted from sliding in the limit groove, the movable clamp arm is arranged on the sliding seat.

Another aspect of the present disclosure provides that the adjusting mechanism further includes a screw and a driving assembly, the screw is rotatably arranged in the limit groove, the screw penetrates and is screwed to the sliding seat, the driving assembly is connected to one end of the screw away from the base, when the driving assembly rotates along a first direction, the driving assembly drives the screw to rotate along the first direction such that the sliding seat drives the movable clamp arm to move close to the fixed clamp arm, when the driving assembly rotates along a second direction in reverse to the first direction, the driving assembly drives the screw to rotate along the second direction such that the sliding seat drives the movable clamp arm to move away from the fixed clamp arm.

Another aspect of the present disclosure provides that the adjusting mechanism further includes a limit disk, the limit disk defines a stopping notch, the driving assembly includes a rotation seat and a lock toggle, the limit disk is fixed between the rotation seat and an end of the main bracket, the rotation seat is connected to the end of the screw away from the base, the lock toggle is pivoted to the rotation seat, when the lock toggle pivots into the stopping notch, the lock toggle is limited by the limit disk to make the driving assembly unable to rotate.

Another aspect of the present disclosure provides that the fixed clamp arm is pivoted to the base or the main bracket, the movable clamp arm is pivoted to the sliding seat, the fixed clamp arm and the movable clamp arm pivot between a folding position and a working position, when the fixed clamp arm and the movable clamp arm are located at the folding position, the fixed clamp arm and the movable clamp arm are parallel to the longitudinal direction, when the fixed clamp arm and the movable clamp arm are located at the working position, the fixed clamp arm and the movable clamp arm are substantially perpendicular to the longitudinal direction.

Another aspect of the present disclosure provides that the fixed clamp arm includes a first arm, the movable clamp arm includes a second arm, the first arm defines a first clamping groove, the second arm defines a second clamping groove, the first clamping groove and the second clamping groove clamp an outer edge of the workpiece together.

Another aspect of the present disclosure provides that the fixed clamp arm further includes a first clamping block pivoted to the first arm, the movable clamp arm further includes a second clamping block pivoted to the second arm, the first clamping block has a first clamping surface, the second clamping block has a second clamping surface, the first clamping surface and the second clamping surface may clamp two opposite sides of the workpiece together.

Another aspect of the present disclosure provides that further includes a pair of sub brackets, the fixed clamp arm is connected to the main bracket, the main bracket and the sub brackets are respectively pivoted to the base.

Another aspect of the present disclosure provides that further includes a pair of sub brackets, the fixed clamp arm is connected to the base, the main bracket and the sub brackets are respectively pivoted to the base and surround the fixed clamp arm together.

Another aspect of the present disclosure provides that further includes a pair of sub brackets, the main bracket and the fixed clamp arm are pivoted to the base, the sub brackets are respectively pivoted to one end of the fixed clamp arm away from the base.

The photograph device holder of the present disclosure fixes the photograph device on the base and drives the movable clamp arm to move close to or away from the fixed clamp arm by the adjusting mechanism such that the movable clamp arm and the fixed clamp arm may clamp or release the workpiece together. Thus, the photograph device holder may clamp and fix on articles of different shapes or sizes depending different using circumstance such that the photograph device may shoot stably.

DETAILED DESCRIPTION

Figure 1:
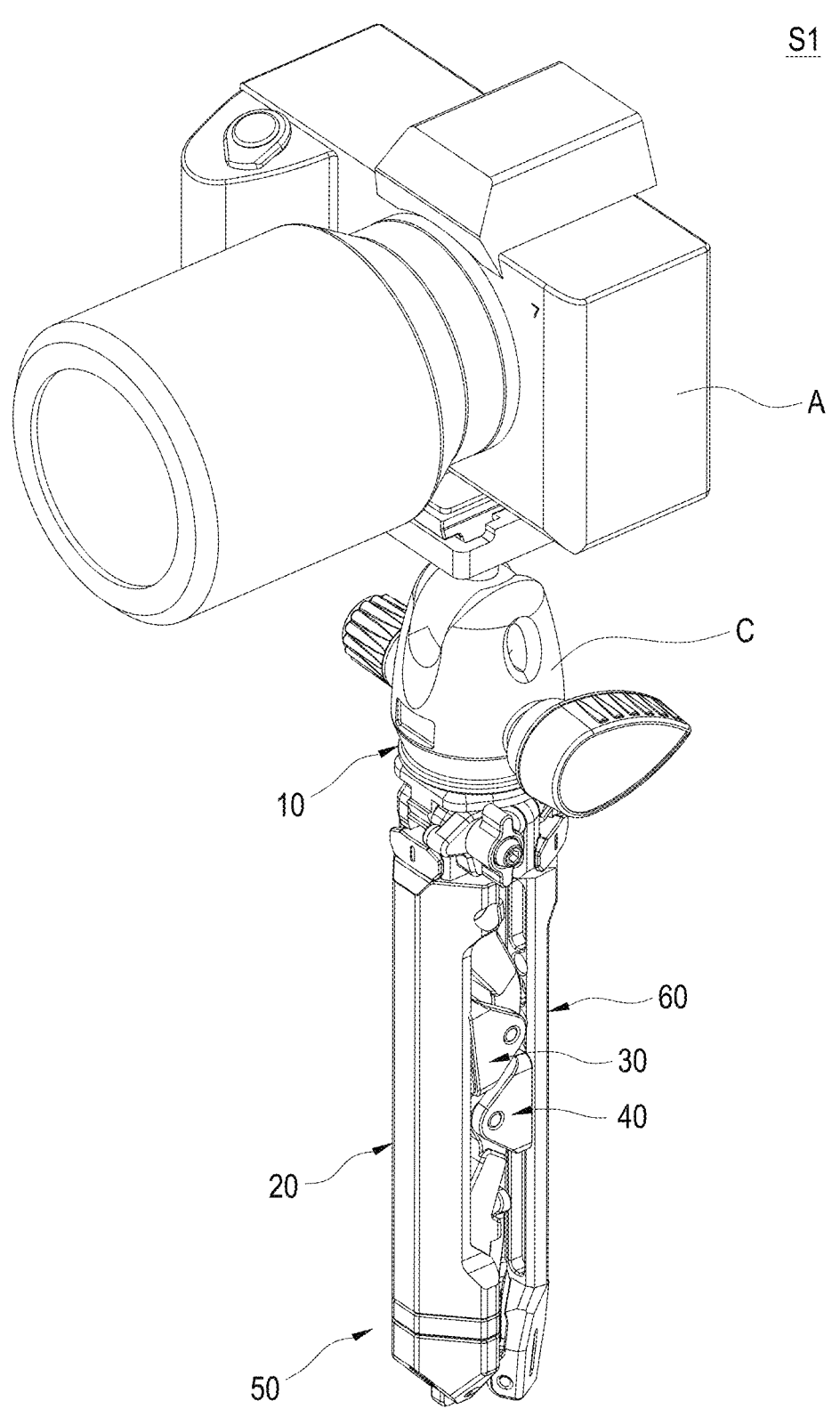
FIG. 1 is a perspective appearance view of using status in first embodiment of the present disclosure.

It is to be understood that the terms for indicating positions and the location relation, for example "front", "rear", "left", "right", "front end", "rear end", "distal end", "longitudinal direction", "lateral direction", "vertical direction", "top" and "bottom", are based on the positions and the location relation disclosed in the drawings, and only used for disclosing the present disclosure and not used for indicating or implying the specified location of the device or the components or the specified structure and operation in certain location, thus the present disclosure is not intended to be limiting.

For example, the terms of "first", "second", "third", "forth" and "fifth" are used for illustrating each unit, component, area, layer and/or part. The component, the unit, the area, the layer and/or the part are not limited by the terms. These terms are only used for separating the element, the assembly, the area, the layer, or the part. Unless being clearly indicated according to the whole specification, the terms for example "the first", "the second", "the third", "the fourth" and "the fifth" are not used for implying the order or sequence.

As used herein and not otherwise defined, the terms "substantially" and "approximately" are used to describe and describe small changes. When used in connection with an event or situation, the terms may include the precise moment at which the event or situation occurs, as well as the event or situation occurring to a close approximation. For example, when combined with a numerical value, the terms may include a range of variation equal to or less than ±5% of the numerical value, such as equal to or less than ±4%, equal to or less than ±3%, equal to or less than ±2%, equal to or less than ±1%, equal to or less than ±0.5%, equal to or less than ±0.1%, or equal to or less than ±0.05%.

The technical contents of the present disclosure will become apparent with the detailed description of embodiments and the accompanied drawings as follows. However, it shall be noted that the accompanied drawings are for illustrative purposes only such that they shall not be used to restrict the scope of the present disclosure.

Figure 7:
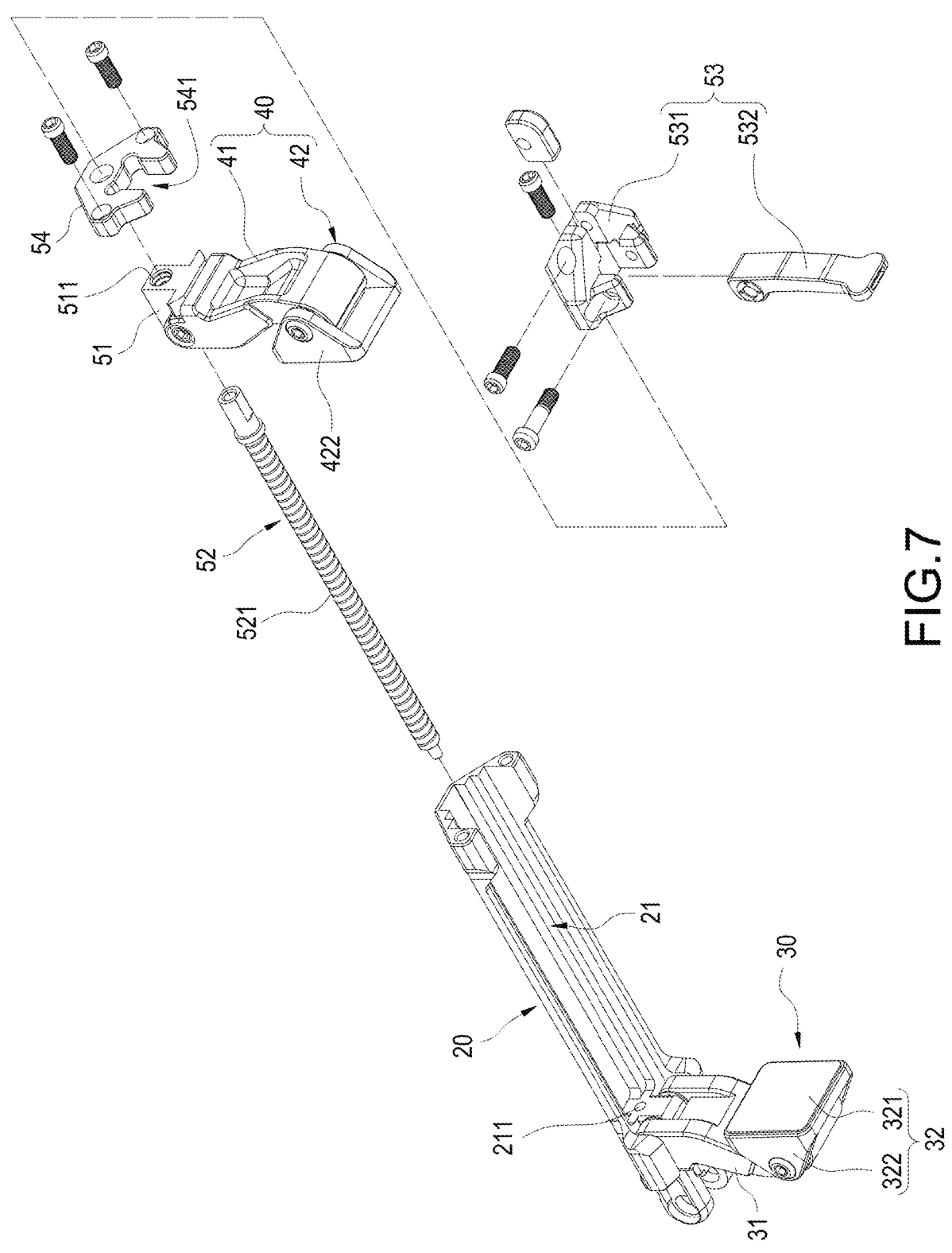
FIG. 7 is a partially exploded view in first embodiment of the present disclosure.

Please refer to FIG. 1, FIG. 2, FIG. 3, FIG. 4, FIG. 5, and FIG. 6, the present disclosure provides a photograph device holder for a photograph device A to be fixed and is used to clamp and be fixed on a workpiece B. The photograph device A may be a camera or a cellphone, yet this is not intended to limit the present disclosure. Please refer to FIG. 7, FIG. 8, and FIG. 9, which show the first embodiment of the present disclosure. The photograph device holder includes a base 10, a main bracket 20, a fixed clamp arm 30, a movable clamp arm 40, and an adjusting mechanism 50.

The photograph device A is arranged on the base. In detail, the photograph device A may be arranged on the base 10 through a connection device C. In the embodiment, the connection device C is a tripod head to fix the photograph device A that is a camera, but the connection device C of the present disclosure is not limit to this form. For example, the connection device C may also be a phone clamp-holder to fix the photograph device A that is a cellphone. The tripod head and the phone clamp-holder are commonly known connection devices C. Despite the figures of the present disclosure do not show the form of the phone clamp-holder of the connection device C, the tripod head and the phone clamp-holder still shall be the connection device C considered to be within the claimed scope of the present disclosure. In addition, the connection device C of the present disclosure is not limited to the tripod head and the phone clamp-holder, other forms of the connection device C applicable for the photograph device A to be fixed shall be considered to be within the claimed scope of the present disclosure.

The main bracket 20 is connected to the base 10. In detail, the main bracket 20 is connected to a side of the base 10 opposite to the photograph device A, that is the main bracket 20 and the photograph device A are located on two opposite sides of the base 10 so as to not interfere with each other. In the embodiment, the main bracket 20 is pivoted to the base 10 to adjust an angle between the main bracket 20 and the base 10, but the present disclosure is not limited to this embodiment. The main bracket 20 extends along a longitudinal direction D to form elongated strip shape. In detail, the main bracket 20 is extending away from the base 10.

The fixed clamp arm 30 is arranged on the base 10 or the main bracket 20. In the embodiment, the fixed clamp arm 30 is arranged on the main bracket 20, but the present disclosure is not limited to this embodiment. The other position of the fixed clamp arm 30 will be described later in other embodiments, so the description thereof is omitted here for brevity. The movable clamp arm 40 may move along the longitudinal direction D. The movable clamp arm 40 and the fixed clamp arm 30 are configured to be opposite to each other.

The adjusting mechanism 50 is arranged on the main bracket 20. The adjusting mechanism 50 may drive the movable clamp arm 40 to move close to or away from the fixed clamp arm 30 along the longitudinal direction D such that the movable clamp arm 40 and the fixed clamp arm 30 may clamp or release the workpiece B together. Thus, the photograph device holder of the present disclosure fixes the photograph device A on the base 10 and drives the movable clamp arm 40 to move close to or away from the fixed clamp arm 30 by the adjusting mechanism 50 such that the movable clamp arm 40 and the fixed clamp arm 30 may clamp the workpiece B together or release the workpiece B. The photograph device holder is therefore clamping and fixing on workpieces B of different shapes or sizes depending different using circumstance such that the photograph device A may shoot stably.

Details are provided as follows. Please refer again to FIG. 7. The main bracket 20 defines a limit groove 21. The limit groove 21 is configured to extend along the longitudinal direction D and located on an inner side of the main bracket 20. The adjusting mechanism 50 includes a sliding seat 51, a screw 52, and a driving assembly 53. The sliding seat 51 is accommodated in the limit groove 21. Two opposite sides of the sliding seat 51 are limited by the limit groove 21 such that the sliding seat 51 is restricted from sliding along the longitudinal direction D in the limit groove 21. The movable clamp arm 40 is arranged on the sliding seat 51 such that the movable clamp arm 40 may slide along the longitudinal direction D with the sliding seat 51. The screw 52 is rotatably arranged in the limit groove 21. In detail, one end of the screw 52 is rotatably inserted in a fixing hole 211 of the limit groove 21 facing (adjacent) to a side of the base 10. The screw 52 penetrates the sliding seat 51, and an outer thread 521 of the screw 52 is screwed to a screw hole 511 of the sliding seat 51. Because the two sides of the sliding seat 51 are limited by the limit groove 21, the screw 52 may drive the screw hole 511 of the sliding sear 51 through the outer thread 521 to slide the sliding seat 51 along the longitudinal direction D when the screw 52 rotates. The driving assembly 53 is connected to another end of the screw 52 (that is the end of the screw 52 away from the base 10). When the driving assembly 53 rotates along a first direction, the driving assembly 53 drives the screw 52 to rotate along the first direction such that the sliding seat 51 drives the movable clamp arm 40 to move close to the fixed clamp arm 30. When the driving assembly 53 rotates along a second direction in reverse to the first direction, the driving assembly 53 drives the screw 52 to rotate along the second direction such that the sliding seat 51 drives the movable clamp arm 40 to move away from the fixed clamp arm 30.

In the embodiment, the adjusting mechanism 50 further includes a limit disk 54, and the driving assembly 53 includes a rotation seat 531 and a lock toggle 532. The limit disk 54 is fixed between an end of the main bracket 20 (that is the end of the main bracket 20 away from the base 10) and the rotation seat 531. The limit disk 54 defines a stopping notch 541. The rotation seat 531 is connected to the end of the screw 52 away from the base 10, and the rotation seat 531 is rotatably connected to the limit disk 54. The lock toggle 532 is pivoted to the rotation seat 531 such that the lock toggle 532 may rotate relative to the rotation seat 531. Thus, when the lock toggle 532 pivots into the stopping notch 541, the lock toggle 532 is limited by the limit disk 54 to make the driving assembly 53 unable to rotate and lock a position of the movable clamp arm 40. When the user needs to adjust the position of the movable clamp arm 40, the user only needs to pivot the lock toggle 532 to detach from the stopping notch 541 so as to rotate the driving assembly 53 to adjust the position of the movable clamp arm 40.

Figure 2:
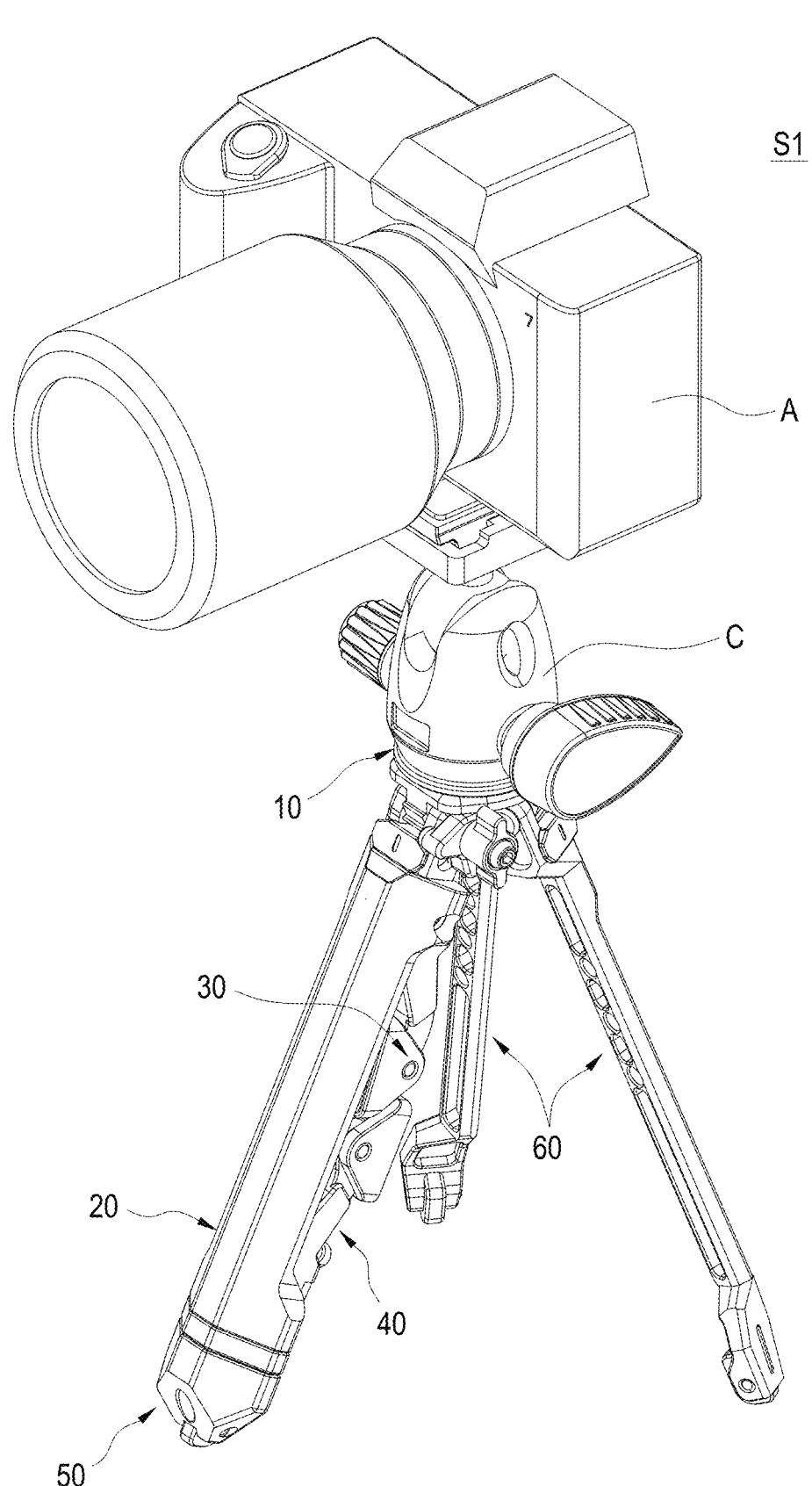
FIG. 2 is a perspective appearance view of another using status in first embodiment of the present disclosure.

In addition, the fixed clamp arm 30 is pivoted to the base 10 or the main bracket 20. The movable clamp arm 40 is pivoted to the sliding seat 51. Thus, the fixed clamp arm 30 and the movable clamp arm 40 may pivot and switch between a folding position S1 and a working position S2. As shown in FIG. 1 and FIG. 2, when the fixed clamp arm 30 and the movable clamp arm 40 are located at the folding position S1, the fixed clamp arm 30 and the movable clamp arm 40 are parallel to the longitudinal direction D to reduce volume to facilitate storage. As shown in FIG. 3, FIG. 4, FIG. 5, and FIG. 6, when the fixed clamp arm 30 and the movable clamp arm 40 are located at the working position S2, the fixed clamp arm 30 and the movable clamp arm 40 are substantially perpendicular to the longitudinal direction D such that the fixed clamp arm 30 and the movable clamp arm 40 may clamp and fix the workpiece B.

Figure 8:
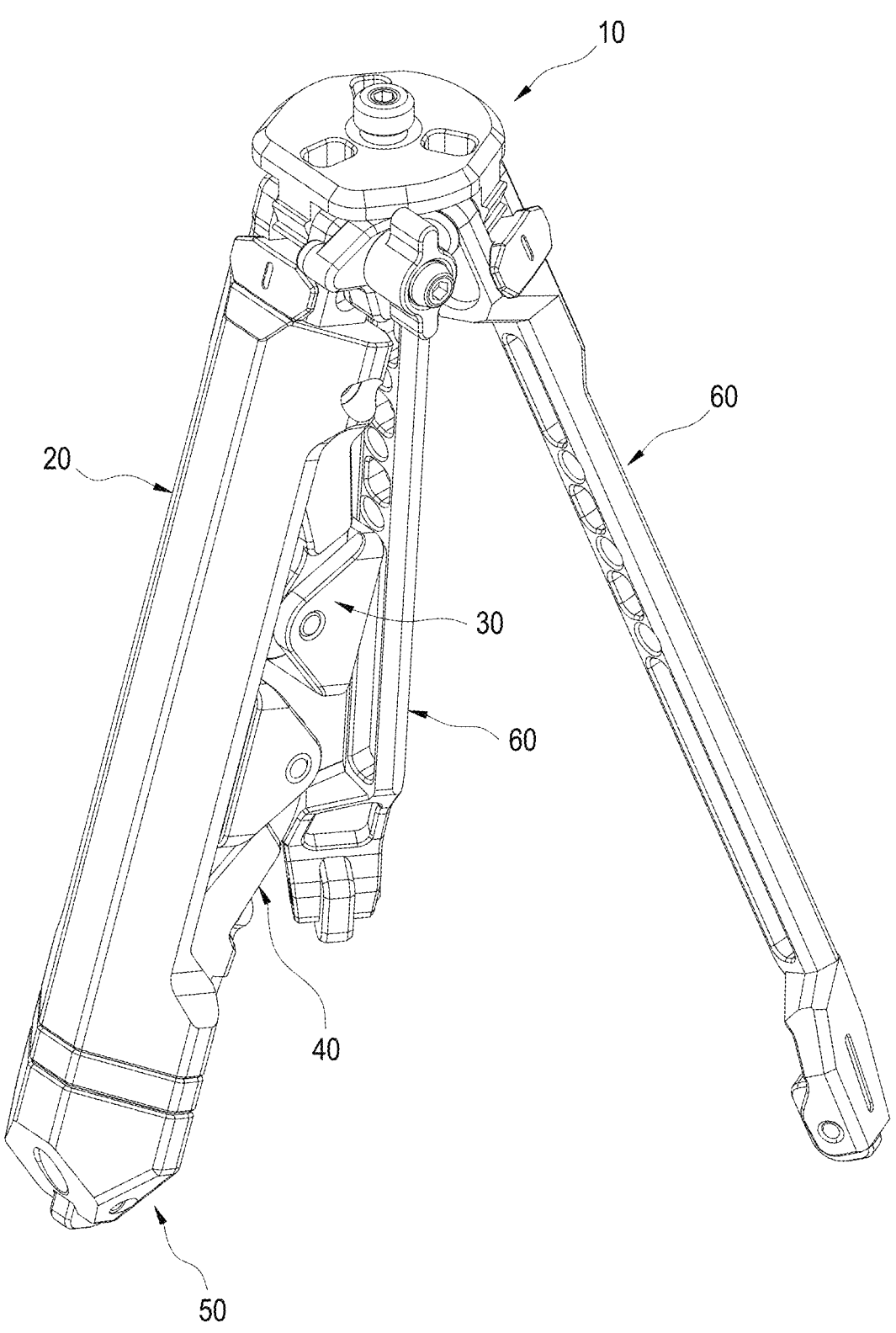
FIG. 8 is a perspective appearance view in first embodiment of the present disclosure when expanding.
Figure 9:
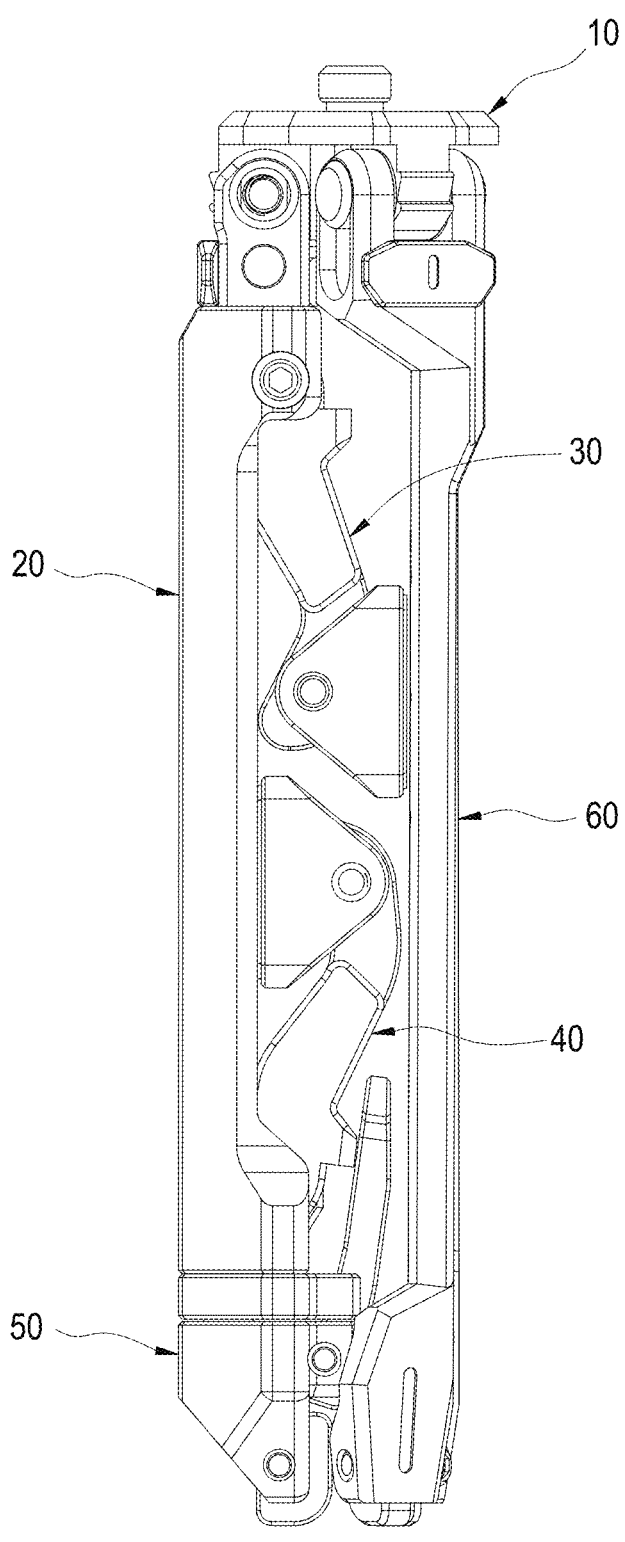
FIG. 9 is a side view in first embodiment of the present disclosure when folding.

In the embodiment, the fixed clamp arm 30 is pivoted to the main bracket 20, and the photograph device holder of the present disclosure further includes a pair of sub brackets 60. Please refer again to FIG. 1, FIG. 2, FIG. 3, FIG. 8, FIG. 9, and FIG. 10. The main bracket 20 and the sub brackets 60 are respectively pivoted to the base 10. In detail, the main bracket 20 and the sub brackets 60 are located on a side of the base 10 opposite to the photograph device A, and the main bracket 20 and the sub brackets 60 are arranged at equal angles in a triangle shape. Thus, as shown in FIG. 1 and FIG. 9, when the main bracket 20 and the sub brackets 60 pivot relative to the base 10 to be parallel to each other, the main bracket 20 and the sub brackets 60 are folding to a cudgel structure (bar-shaped structure) for easily carrying and grasping by user. As shown in FIG. 2 and FIG. 8, when the main bracket 20 and the sub brackets 60 pivot relative to the base 10 to expand, the main bracket 20 and the sub brackets 60 are expanding to a triangular pyramid-shaped tripod structure such that the photograph device holder may place it on the ground or other flat surface to use.

Details are provided as follows. The fixed clamp arm 30 includes a first arm 31, and the movable clamp arm 40 includes a second arm 41. Please refer again to FIG. 5 and FIG. 6. The first arm 31 defines a first clamping groove 311, and the second arm 41 defines a second clamping groove 411. The first clamping groove 311 and the second clamping groove 411 may clamp an outer edge of the workpiece B together. In detail, the first clamping groove 311 and the second clamping groove 411 in the embodiment are respectively a concave V-shape to clamp the outer edge of the workpiece B with non-parallel sides (for example, a section of the outer edge is circle, oval, triangle, irregular shape . . . etc.), such as a rod or a jagged object . . . etc., but the shapes of the first clamping groove 311 and the second clamping groove 411 of the present disclosure are not limited to V-shape. For example, the shapes of the first clamping groove 311 and the second clamping groove 411 may also be arc-shaped or irregular grooves.

Figure 3:
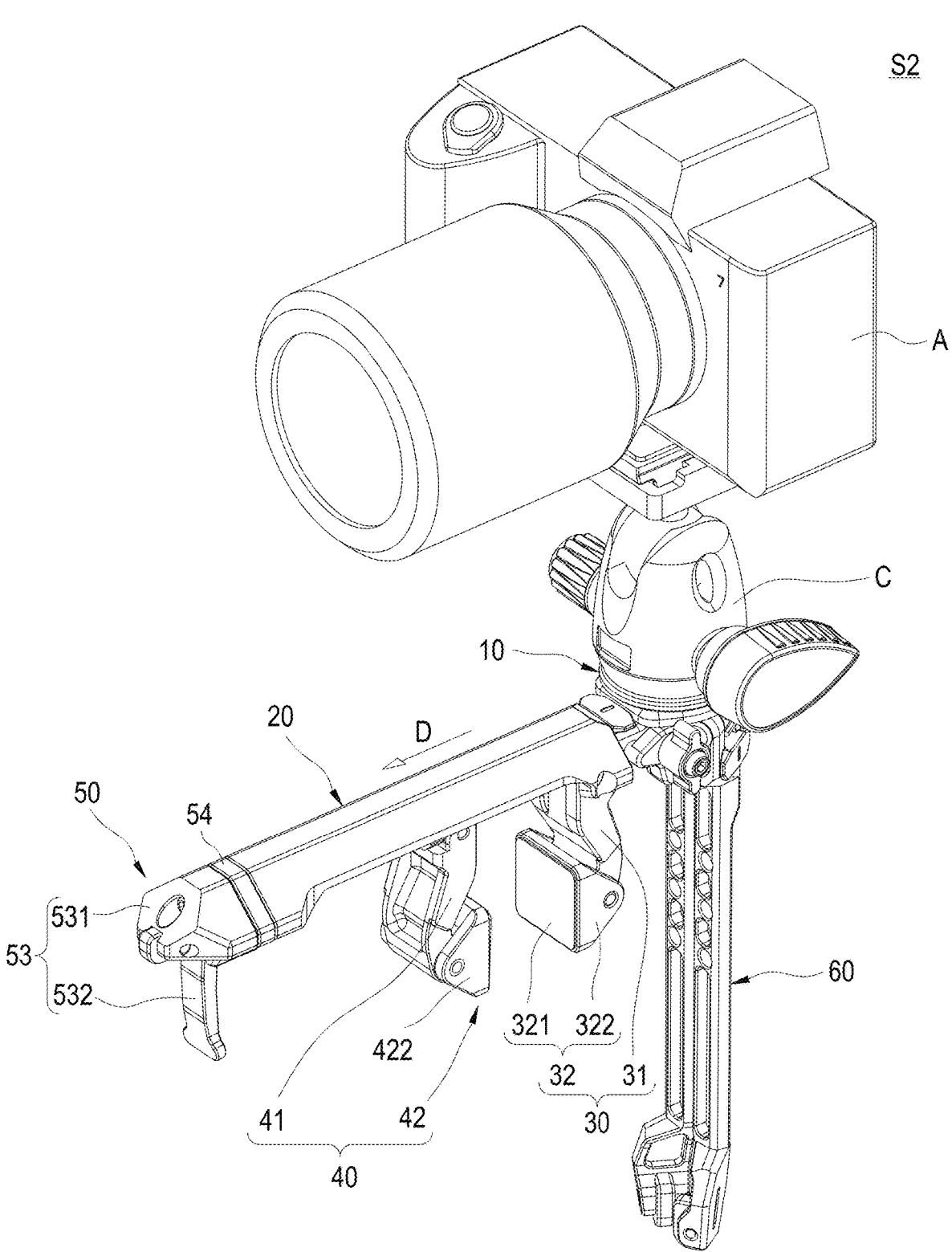
FIG. 3 is a perspective appearance view of still another using status in first embodiment of the present disclosure.
Figure 4:
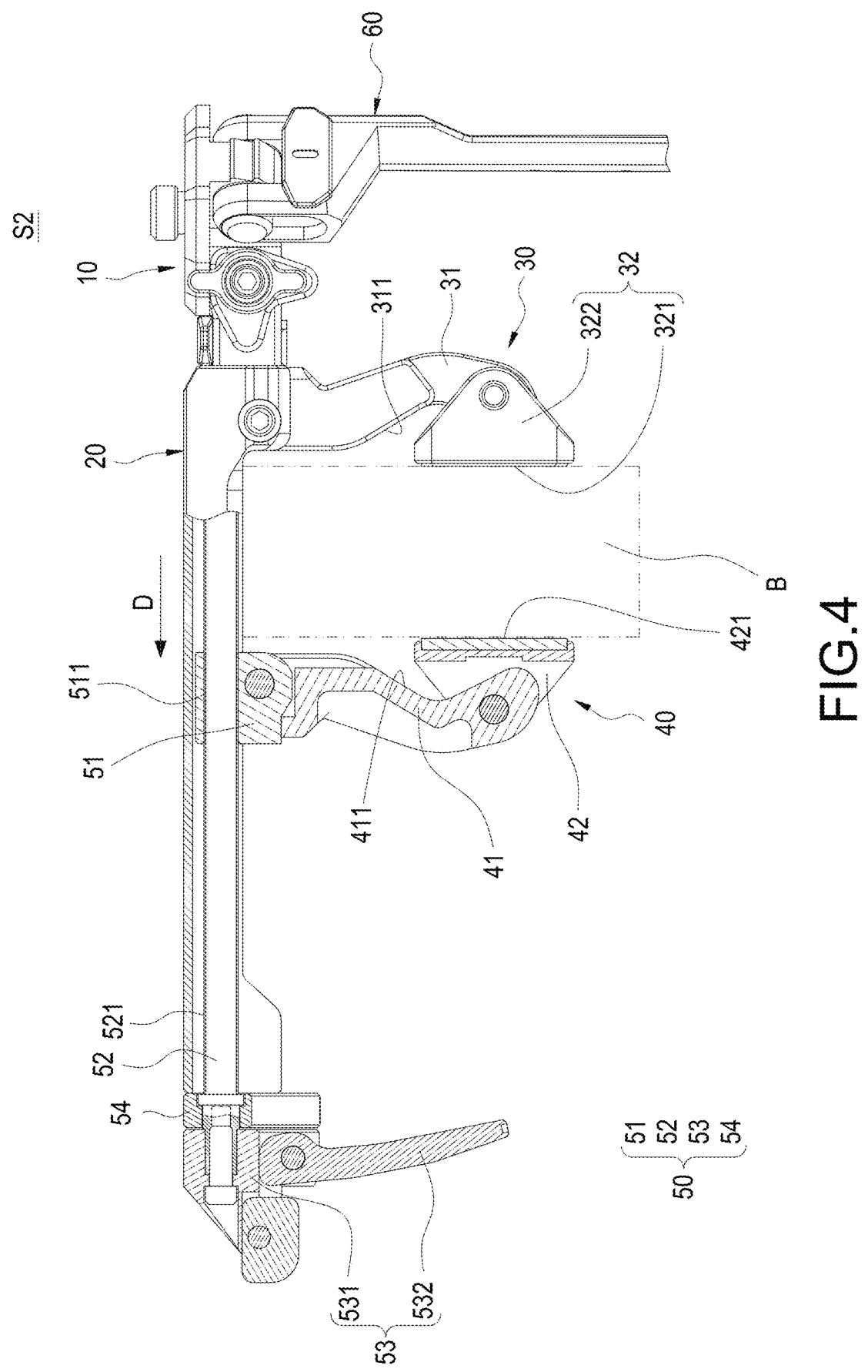
FIG. 4 is a cross-sectional side view of FIG. 3.
Figure 5:
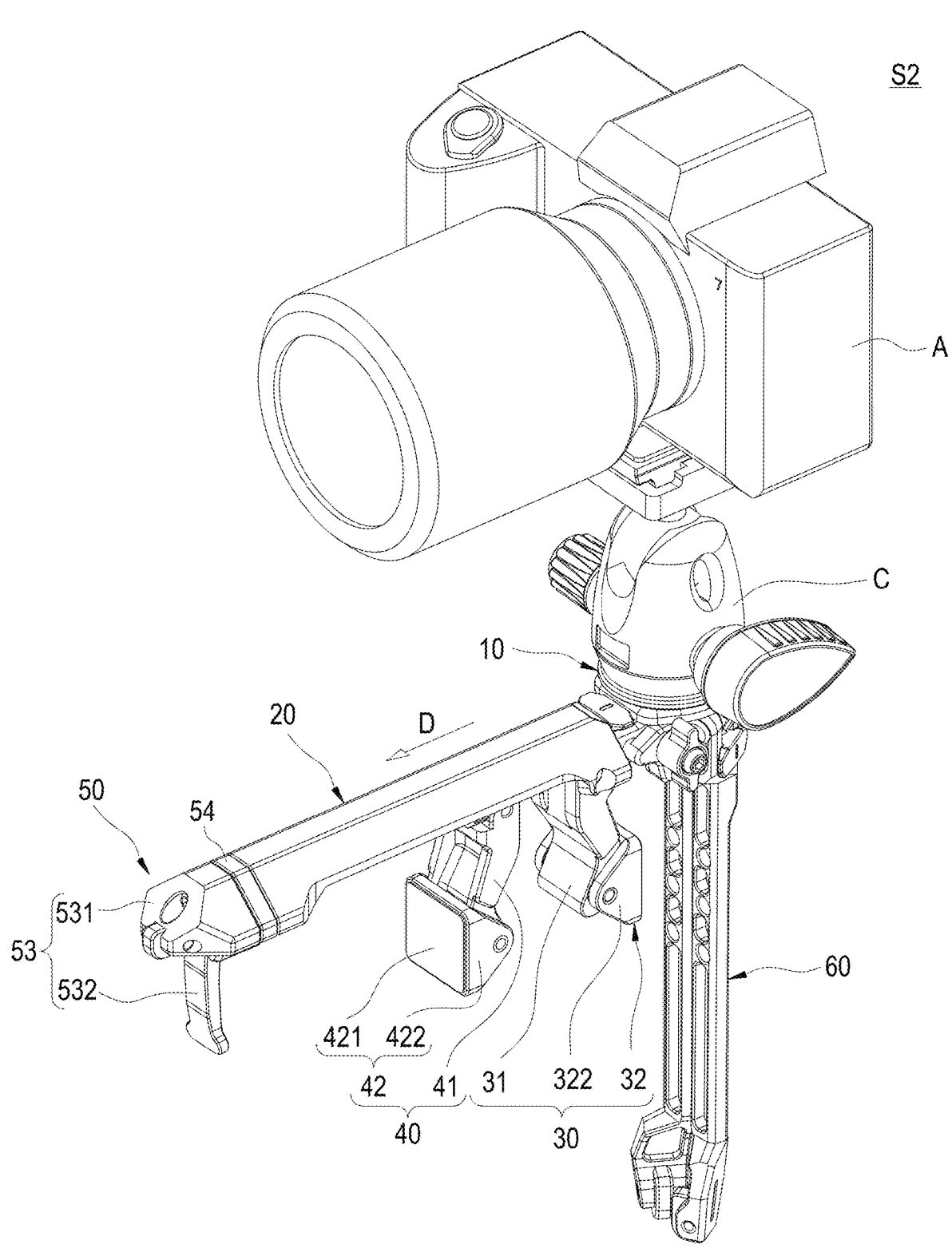
FIG. 5 is a perspective appearance view of still another using status in first embodiment of the present disclosure.
Figure 6:
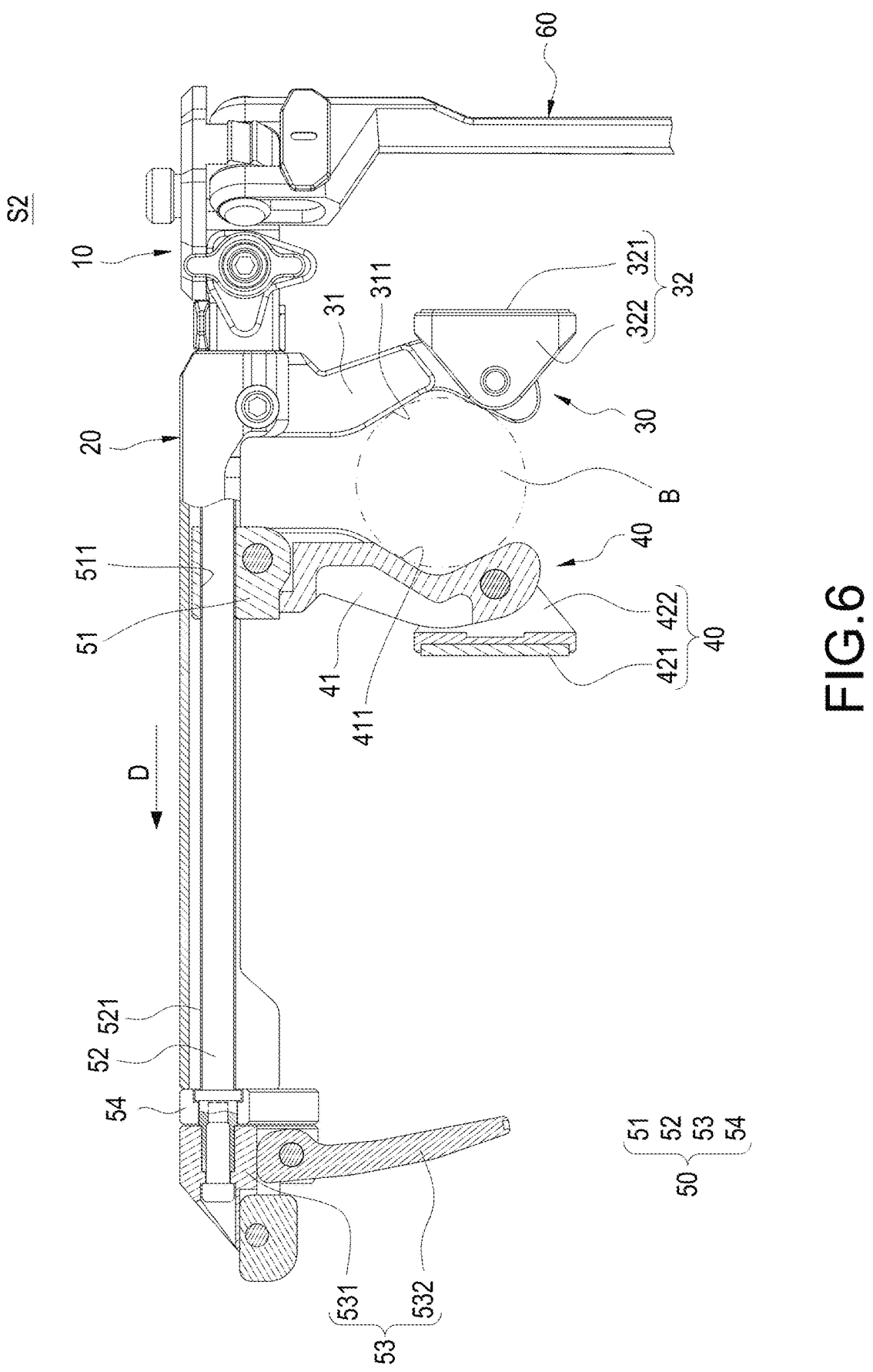
FIG. 6 is a cross-sectional side view of FIG. 5.

In addition, the fixed clamp arm 30 further includes a first clamping block 32 pivoted to the first arm 31, and the movable clamp arm 40 further includes a second clamping block 42 pivoted to the second arm 41. The first clamping block 32 has a first clamping surface 321, and the second clamping block 42 has a second clamping surface 421. Thus, the user may pivot the first clamping block 32 and the second clamping block 42 according to needs to adjust the first clamping block 32 and the second clamping block 42 for workpieces B with the different outer edges. In detail, as shown in FIG. 3 and FIG. 4. When the outer edge of the workpiece B has a parallel side (for example, the section of the outer edge is rectangle, square, or regular polygon), such as a table boards, a block object, or a plate-shaped objects . . . etc., the user may pivot the first clamping block 32 and the second clamping block 42 to make the first clamping surface 321 to be parallel to the second clamping surface 421 such that the first clamping surface 321 and the second clamping surface 421 may clamp the two opposite sides of the workpiece B together.

Figure 10:
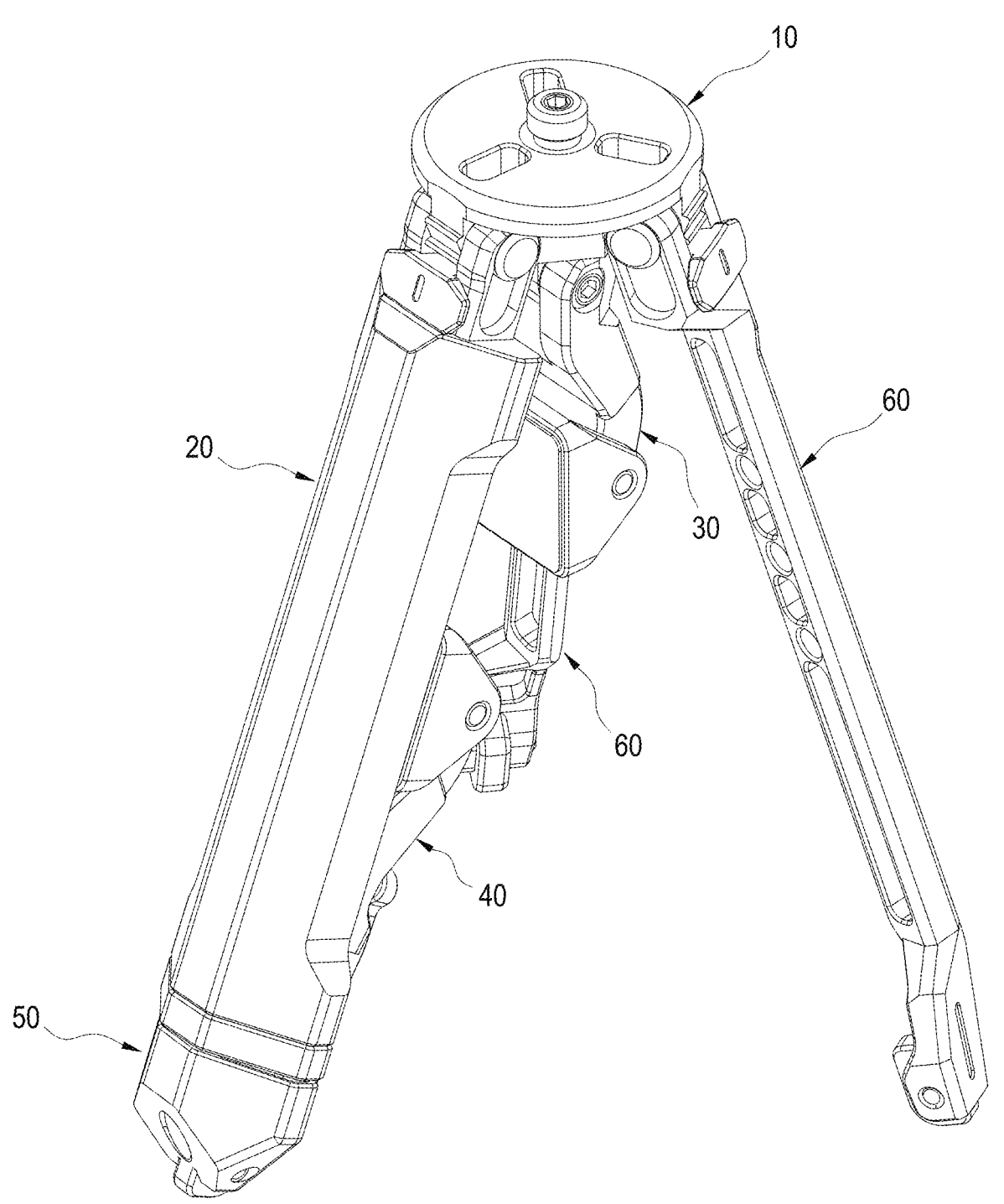
FIG. 10 is a perspective appearance view in second embodiment of the present disclosure when expanding.
Figure 11:
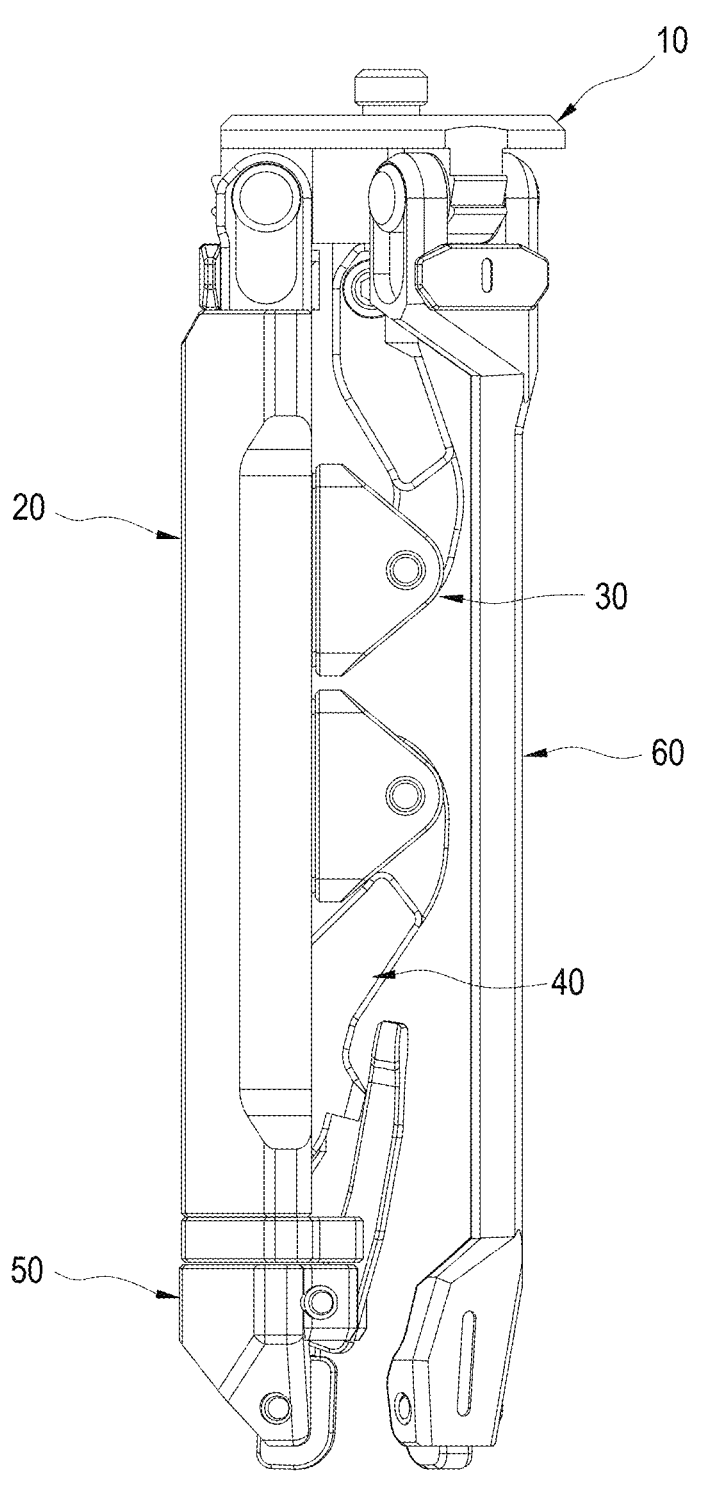
FIG. 11 is a side view in second embodiment of the present disclosure when folding.

Please refer to FIG. 10 and FIG. 11, which show the second embodiment of the present disclosure, the main difference between the second embodiment and the first embodiment mentioned above is that the fixed clamp arm 30 is pivoted and connected to a center of the base 10, details are provided as follows. In the embodiment, the fixed clamp arm 30 and the photograph device A are respectively located on two opposite of the base 10, and the main bracket 20 and sub brackets 60 are respectively pivoted to the base 10 and surround the fixed clamp arm 30 together. Thus, as shown in FIG. 11, when the main bracket 20 and sub brackets 60 pivot relative to the base 10 to be parallel to each other, the main bracket 20 and the sub brackets 60 are still folding to the cudgel structure for the user to easily carry and grasp, and the fixed clamp arm 30 is located between the main bracket 20 and the sub brackets 60 such that the fixed clamp arm 30 may not affect a storage of the main bracket 20 and the sub brackets 60. As shown in FIG. 10, when the main bracket 20 and the sub brackets 60 pivot relative to the base 10 to expand, the main bracket 20 and the sub brackets 60 are expanding to the triangular pyramid-shaped tripod structure such that the photograph device holder may place it on the ground or other flat surface to use, and the fixed clamp arm 30 may still pivot to the working position S2 according to needs to clamp the workpiece B with the movable clamp arm 40.

Figure 12:
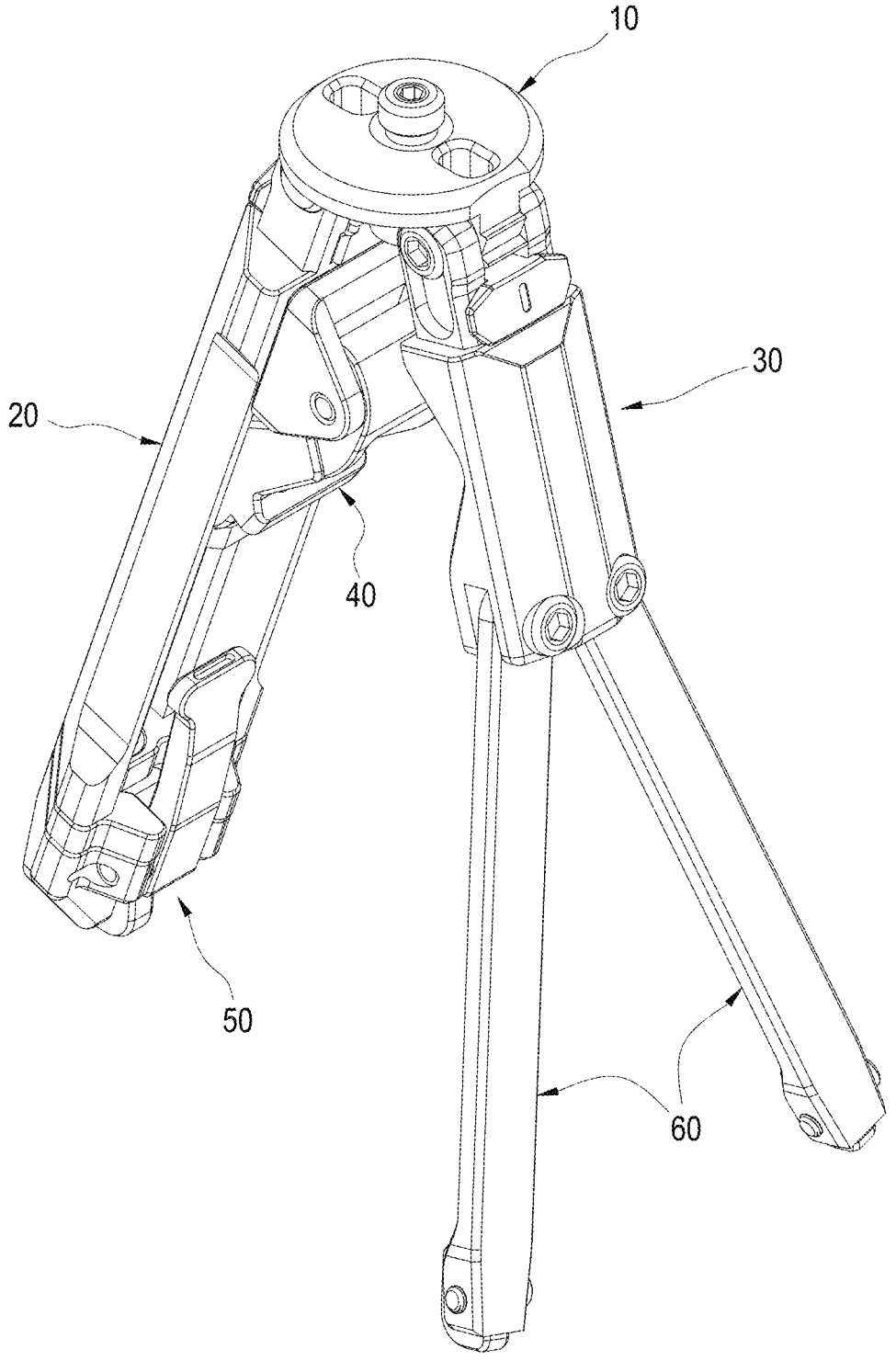
FIG. 12 is a perspective appearance view in third embodiment of the present disclosure when expanding.
Figure 13:
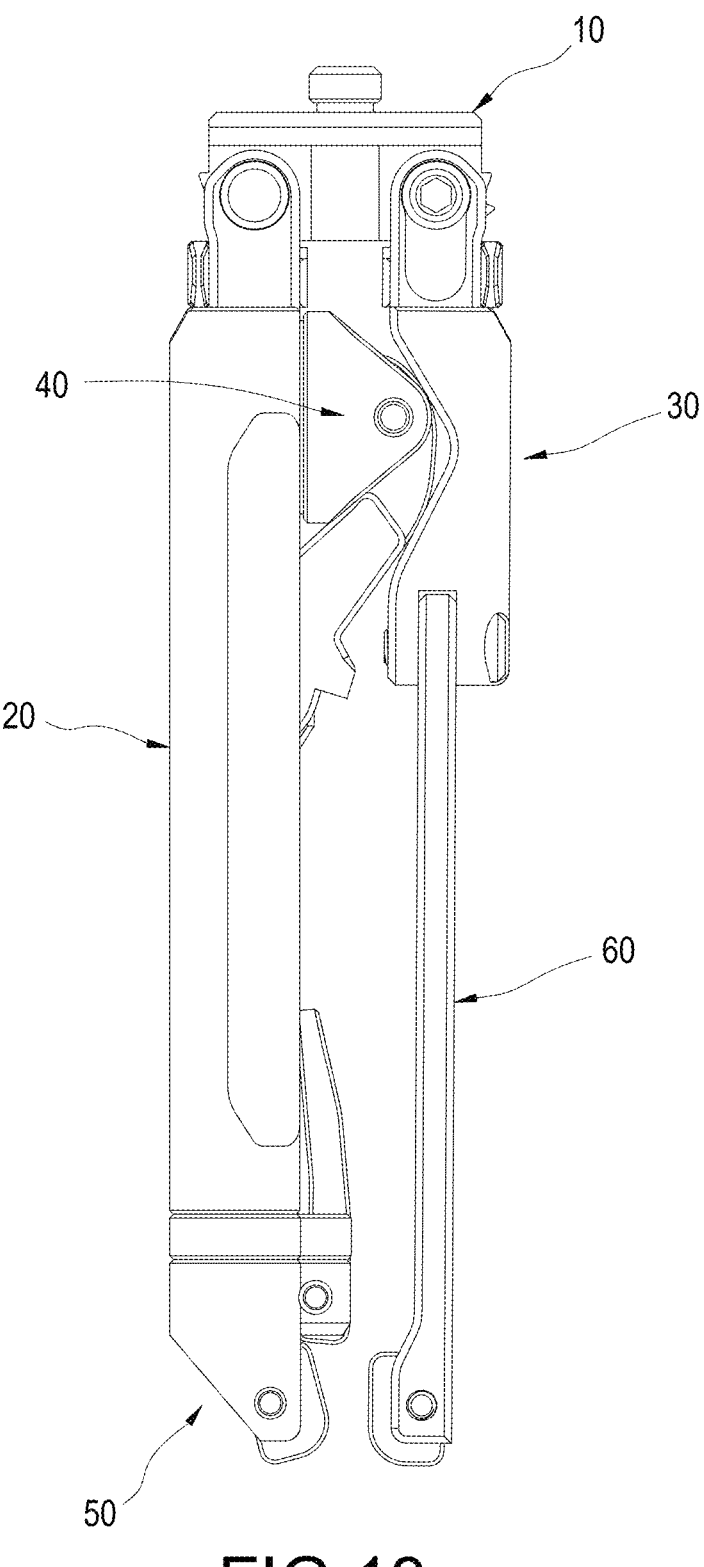
FIG. 13 is a side view in third embodiment of the present disclosure when folding.

Please refer to FIG. 12 and FIG. 13, which show the third embodiment of the present disclosure, the main difference between the third embodiment and the first embodiment mentioned above is that the fixed clamp arm 30 is pivoted and connected to the base 10, and the sub brackets 60 are pivoted to the fixed clamp arm 30, details are provided as follows. In the embodiment, the fixed clamp arm 30 and the main bracket 20 are relative to each other and pivoted to the base 10 such that the fixed clamp arm 30 and the main bracket 20 are located on a side of the base 10 opposite to the photograph device A, and the sub brackets 60 are respectively pivoted to one end of the fixed clamp arm 30 away from the base 10. Thus, as shown in FIG. 13, when the main bracket 20 pivots relative to the base 10 and the sub brackets 60 pivot relative to the fixed clamp arm 30 such that the main bracket 20 and the sub brackets 60 are parallel to each other, the main bracket 20 and the sub brackets 60 are still folding to the cudgel structure for the user to easily carry and grasp, and the movable clamp arm 40 is accommodated in the first clamping groove 311 of the fixed clamp arm 30 such that the movable clamp arm 40 may not affect a storage of the main bracket 20 and the sub brackets 60. As shown in FIG. 12, when the main bracket 20, the fixed clamp arm 30, and the sub brackets 60 pivot relative to the base 10 to expand, the main bracket 20, the fixed clamp arm 30, and the sub brackets 60 are expanding to the triangular pyramid-shaped tripod structure such that the photograph device holder may place it on the ground or other flat surface to use, and the fixed clamp arm 30 may not only be a part of the tripod for using but also be used to clamp the workpiece B with the movable clamp arm 40 according to needs.

Figure 14:
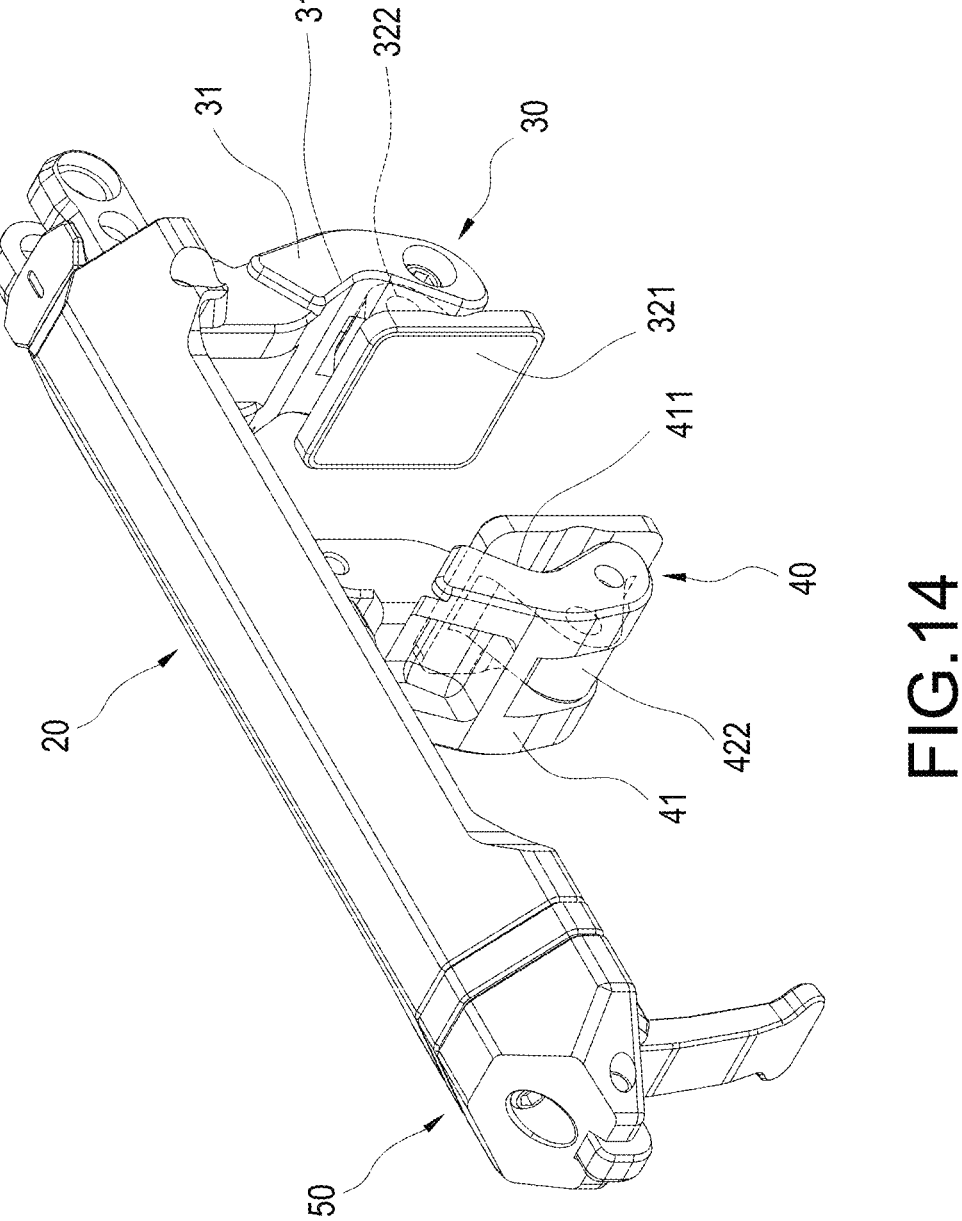
FIG. 14 is a partially perspective appearance view in fourth embodiment of the present disclosure.

Details are provided as follows, please refer again to FIG. 3, FIG. 4, FIG. 5, FIG. 6, FIG. 7, FIG. 8, and FIG. 9. In the first embodiment of the present disclosure, the first clamping block 32 and the second clamping block 42 respectively has a pair of first pivoting portions 322 and a pair of second pivoting portions 422. In the fixed clamp arm 30, the first pivoting portions 322 are adapted to sheathe and pivoted to two opposite sides of the first arm 31. In the movable clamp arm 40, the second pivoting portions 422 are adapted to sheathe and pivoted to two opposite sides of the second arm 41. However, the present disclosure is not limited to this embodiment. For example, as shown in FIG. 14 is the fourth embodiment of the present disclosure. The main difference between the fourth embodiment and the first embodiment mentioned above is that the first clamping block 32 and the second clamping block 42 respectively has only one first pivoting portion 322 and only one second pivoting portion 422. In detail, in the fourth embodiment, the first pivoting portion 322 is inserted and pivoted to an end of the first arm 31 away from the main bracket 20, and the second pivoting portion 422 is inserted and pivoted to an end of the second arm 41 away from the main bracket 20. In other words, the only difference between the first embodiment and the fourth embodiment is the pivoting method of the first clamping block 32 and the second clamping block 42, so the first embodiment and the fourth embodiment shall all be considered to be within the claimed scope of the present disclosure. However, the first clamping block 32 and the second clamping block 42 may also use other pivoting methods not described, but those pivoting methods may be modified and adjusted based on the present disclosure such that those pivoting methods shall be considered to be within the claimed scope of the present disclosure.

The photograph device holder of the present disclosure fixes the photograph device A on the base 10 and drives the movable clamp arm 40 to move close to or away from the fixed clamp arm 30 by the adjusting mechanism 50 such that the movable clamp arm 40 and the fixed clamp arm 30 may clamp the workpiece B together or release the workpiece B. The photograph device holder is therefore clamping and fixing on workpieces B of different shapes or sizes depending different using circumstance such that the photograph device A may shoot stably.

It shall be understood that the present disclosure may have other types of embodiments, and a person with ordinary skills in the art of the technical field of the present disclosure may make various changes and modifications corresponding to the present disclosure without deviating the principle and substance of the present disclosure; however, such corresponding changes and modification shall be considered to be within the claimed scope of the present disclosure.

What is claimed is:

1. A photograph device holder, for a photograph device to be fixed and used to clamp on a workpiece, the photograph device holder comprising:
   a base, wherein the photograph device arranged on the base;
   a main bracket, connected to the base and extending along a longitudinal direction;
   a fixed clamp arm, arranged on the base or the main bracket;
   a movable clamp arm movable along the longitudinal direction; and
   an adjusting mechanism, arranged on the main bracket, the adjusting mechanism configured to drive the movable clamp arm to move close to or away from the fixed clamp arm along the longitudinal direction such that the movable clamp arm and the fixed clamp arm may clamp the workpiece together or release the workpiece.

2. The photograph device holder according to claim 1, wherein the main bracket defines a limit groove, the limit groove is configured to extend along the longitudinal direction, the adjusting mechanism comprises a sliding seat, the sliding seat is accommodated in the limit groove and restricted from sliding in the limit groove, the movable clamp arm is arranged on the sliding seat.

3. The photograph device holder according to claim 2, wherein the adjusting mechanism further comprises a screw and a driving assembly, the screw is rotatably arranged in the limit groove, the screw penetrates and is screwed to the sliding seat, the driving assembly is connected to one end of the screw away from the base, when the driving assembly rotates along a first direction, the driving assembly drives the screw to rotate along the first direction such that the sliding seat drives the movable clamp arm to move close to the fixed clamp arm, when the driving assembly rotates along a second direction in reverse to the first direction, the driving assembly drives the screw to rotate along the second direction such that the sliding seat drives the movable clamp arm to move away from the fixed clamp arm.

4. The photograph device holder according to claim 3, wherein the adjusting mechanism further comprises a limit disk, the limit disk defines a stopping notch, the driving assembly comprises a rotation seat and a lock toggle, the limit disk is fixed between the rotation seat and an end of the main bracket, the rotation seat is connected to the end of the screw away from the base, the lock toggle is pivoted to the rotation seat, when the lock toggle pivots into the stopping notch, the lock toggle is limited by the limit disk to make the driving assembly unable to rotate.

5. The photograph device holder according to claim 2, wherein the fixed clamp arm is pivoted to the base or the main bracket, the movable clamp arm is pivoted to the sliding seat, the fixed clamp arm and the movable clamp arm pivot between a folding position and a working position, when the fixed clamp arm and the movable clamp arm are located at the folding position, the fixed clamp arm and the movable clamp arm are parallel to the longitudinal direction, when the fixed clamp arm and the movable clamp arm are located at the working position, the fixed clamp arm and the movable clamp arm are substantially perpendicular to the longitudinal direction.

6. The photograph device holder according to claim 1, wherein the fixed clamp arm comprises a first arm, the movable clamp arm comprises a second arm, the first arm defines a first clamping groove, the second arm defines a second clamping groove, the first clamping groove and the second clamping groove clamp an outer edge of the workpiece together.

7. The photograph device holder according to claim 6, wherein the fixed clamp arm further comprises a first clamping block pivoted to the first arm, the movable clamp arm further comprises a second clamping block pivoted to the second arm, the first clamping block comprises a first clamping surface, the second clamping block comprises a second clamping surface, the first clamping surface and the second clamping surface may clamp two opposite sides of the workpiece together.

8. The photograph device holder according to claim 1, further comprising a pair of sub brackets, wherein the fixed clamp arm is connected to the main bracket, the main bracket and the sub brackets are respectively pivoted to the base.

9. The photograph device holder according to claim 1, further comprising a pair of sub brackets, wherein the fixed clamp arm is connected to the base, the main bracket and the sub brackets are respectively pivoted to the base and surround the fixed clamp arm together.

10. The photograph device holder according to claim 1, further comprising a pair of sub brackets, wherein the main bracket and the fixed clamp arm are pivoted to the base, the sub brackets are respectively pivoted to one end of the fixed clamp arm away from the base.

* * * * *